United States Patent [19]

Brown

[11] Patent Number: 4,778,226
[45] Date of Patent: Oct. 18, 1988

[54] ANTI-LOCK BRAKING SYSTEM WITH PUMP, AND THREE-WAY AND TWO-WAY SOLENOID VALVES DEFINING HOLD, BUILD AND DECAY VALVES

[75] Inventor: George E. Brown, Niles, Mich.

[73] Assignee: Allied-Signal Inc., Morristown, N.J.

[21] Appl. No.: 60,194

[22] Filed: Jun. 10, 1987

[51] Int. Cl.4 .......... B60T 8/40; B60T 13/70; B60T 8/44

[52] U.S. Cl. .......... 303/116; 303/10; 303/13; 303/14; 303/61; 303/93; 303/110

[58] Field of Search .......... 303/113–119, 303/100, 93, 110, 10–12, 13–15, 16–17, DIG. 1–4, 61–63, 68–69, 92; 188/181, 411, 358, 359; 60/545, 574–578

[56] References Cited

U.S. PATENT DOCUMENTS

| | | | |
|---|---|---|---|
| 4,402,554 | 9/1983 | Belart | 303/10 |
| 4,462,642 | 7/1984 | Leiber | 303/92 X |
| 4,578,951 | 4/1986 | Belart et al. | 303/114 X |
| 4,620,565 | 11/1986 | Brown | 303/119 X |
| 4,630,871 | 12/1986 | Imoto et al. | 303/114 X |
| 4,640,555 | 2/1987 | Berthling et al. | 303/10 |
| 4,685,747 | 8/1987 | Belart et al. | 303/114 |
| 4,702,336 | 10/1987 | Seibert et al. | 303/114 X |
| 4,708,404 | 11/1987 | Seibert et al. | 303/116 X |
| 4,715,667 | 12/1987 | Otsuki et al. | 303/119 |

FOREIGN PATENT DOCUMENTS

| | | |
|---|---|---|
| 3505410 | 8/1986 | Fed. Rep. of Germany . |
| 2137709 | 10/1984 | United Kingdom . |
| 2173559 | 10/1986 | United Kingdom . |
| 2177468 | 1/1987 | United Kingdom . |
| 21784499 | 2/1987 | United Kingdom ......... 303/116 |

OTHER PUBLICATIONS

Patent Abstract of Japan A 6150861, vol. 10, No. 211, Jul. 24, 1986.
Patent Abstract of Japan A 6144062, vol. 10, No. 200, Jul. 12, 1986.

Primary Examiner—Douglas C. Butler
Attorney, Agent, or Firm—Leo H. McCormick, Jr.; Ken C. Decker

[57] ABSTRACT

An anti-lock braking system includes a master cylinder for supplying pressurized fluid to the vehicle brakes and a pump which operates during anti-lock control to supply fluid during brake pressure build cycles. A braking circuit includes decay valves and build valves to control communication of fluid pressure to the vehicle brakes in response to commands generated by an electronic control unit. A braking source control valve responds to signals generated by the electronic control unit to switch communication of fluid pressure to the braking circuit between the master cylinder and the pump.

5 Claims, 1 Drawing Sheet

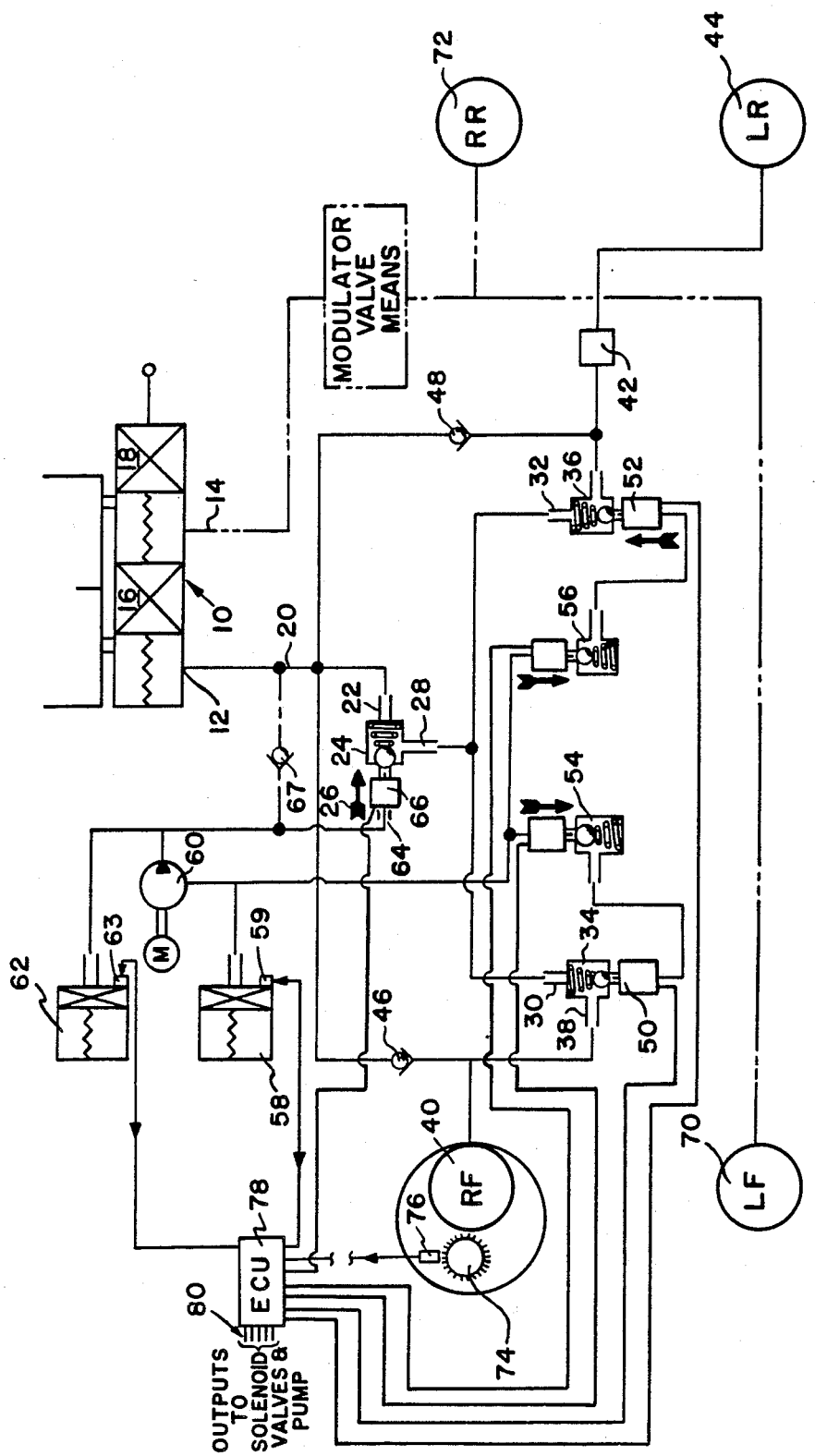

ANTI-LOCK BRAKING SYSTEM WITH PUMP, AND THREE-WAY AND TWO-WAY SOLENOID VALVES DEFINING HOLD, BUILD AND DECAY VALVES

BACKGROUND OF THE INVENTION

The present invention relates to anti-lock braking systems and in particular to an anti-lock braking system of the pump-back type which utilizes a common source control valve for each braking circuit of the system and a modulating valve pair including a build/hold and a decay valve for each control channel of the system.

Anti-lock braking systems are now well known. Contemporary systems, which have been variously denominated as anti-lock, anti-skid and adaptive braking systems, can be roughly categorized as including full power systems which utilize a motor driven pump as a boost source and as the primary source of pressurized brake fluid during anti-lock braking system operation, pump-back anti-lock braking systems which use a vacuum boosted master cylinder as a primary source of pressurized braking fluid and a small intermittently operated pump as a source of pressurized braking fluid during anti-lock operation, and mechanical systems in which variously configured inertia devices are used to sense and modulate the application of brake force of the vehicle's wheels. Of these systems, pump-back systems provide the speed and effectiveness of an electronically controlled system, are directly adaptable to existing vacuum boosted braking systems as an add-on system, and are of somewhat lower cost. Pump-back systems have the further advantage in that they provide a substantially conventional braking system using proven components for the vehicle during non-anti-lock braking system operation.

Of primary concern in the continuing development of anti-lock braking systems is the provision of such a system that is substantially failsafe such a system which allows substantial latitude in control algorithms such that factors including pedal feel, system adaptability, cost and space minimization, simplification, and the like can be accommodated with minimal hardware modifications.

Broadly, the present invention is an anti-lock braking system of the pump-back type which provides a novel combination of three-way source control and build/hold valves in combination with two-way decay valves to produce an anti-lock braking system of reduced complexity, increased reliability, and in which electronically controlled valves provide substantial versatility for electronic control of braking forces and other system parameters. In a specific embodiment of the invention, a single three-way source control valve is provided for each hydraulic circuit of the braking system. This valve is connected in series with a three-way build/hold valve and a two-way decay valve provided for each control channel of the system. A replenishment pump including a sump and an accumulator is provided wherein the sump and accumulator volumes are matched to pump capacity to limit brake fluid depletion. The build/hold valves also function as high pressure relief valves without additional component count. The system provides for pressure decay, hold, and build. The systems existing hydraulic system split is fully maintained. The system minimizes pedal pumping during cycling, and the valve arrangement provides redundant protection.

It is therefore an object of the invention to provide an improved anti-lock braking system of the pump-back type.

Another object of the invention is to provide such a system utilizing a single source control three-way valve for each hydraulic circuit of the system and a three-way build/hold valve and a two-way decay valve for each channel of the system.

Yet another object of the invention is to provide such a system in which the valves are electronically controllable in sequence and overlapping relationship to effect maximum electronic control of factors including braking force pedal drop and feel, and fluid loss during anti-lock operation.

Another object of the invention is to provide such a system having reduced component count.

Yet another object of the invention is to provide such a system effecting minimal pedal pumping during cycling and wherein matched displacement components limit pressure loss with failed pump conditions.

BRIEF DESCRIPTION OF THE DRAWING

These and other objects and purposes of the invention and the invention itself will be best understood in view of the following detailed description thereof taken in conjunction with the appended drawing which is a hydraulic schematic of an anti-lock braking system in accordance with the invention shown for a diagonal split system.

DESCRIPTION OF THE PREFERRED EMBODIMENT

Referring now to the drawing, there shown an anti-lock braking system which includes a master cylinder 10 having two hydraulically isolated outputs or circuits 12, 14 which normally receive manually modulated pressurized braking fluid from piston assemblies 16, 18, respectively. Typically, master cylinder 10 may be vacuum boosted as is well known in the art. Valve 24, as explained in more detail below, functions to isolate the wheel cylinders from the master cylinder and to connect the wheel cylinders to either the master cylinder or a pump assembly. Accordingly, this valve is denominated a source control valve herein. The primary hydraulic circuit 14 and secondary hydraulic circuit 12 are identical and accordingly, a description of the secondary circuit 12 only is provided herein.

An output conduit 20 is connected to the normally open inlet port 22 of a three-way source control valve 24. Valve 24 is solenoid actuated, is shown in its normal state, and is operable in response to an electrical signal in the direction indicated by arrow 26. The outlet port 28 of valve 24 is connected in common to the normally open inlet ports 30, 32 of a pair of solenoid actuated, three-way build/hold valves 34, 36. The outlet 38 of valve 34 is connected to a front wheel brake cylinder 40. The outlet of valve 36 is connected through a conventional brake pressure proportioning valve 42 to a rear wheel brake cylinder 44. Wheel cylinders 40, 44 are connected through respective check valves 46, 48 to the master cylinder outlet conduit 20.

The normally closed outlets 50, 52 of valves 34, 36 are connected through normally closed solenoid actuated two-way decay valves 54, 56 to the inlet of a sump 58 and a motor driven pump 60. The outlet from the pump 60 is presented to an accumulator 62 and through a flow control orifice 64 to the normally closed inlet 66 of valve 24 in outlet conduit 20 from master cylinder. The second hydraulic circuit, identical to that described above, extends from master cylinder output 14 and operates left front and right rear brakes 70, 72, respectively. Again, this portion of the circuit is identical to that already described, and therefore only one of circuits 12, 14 is shown in the drawing for clarity. Typically, each of the front wheels 40, 70 and at least one of the rear wheels 44, 72 are provided with a tone wheel 74 and a magnetic pickup 76 which provide wheel speed information to a micro-processor based electronic control unit 78. The electronic control circuit 78 in turn generates a plurality of output signals at output terminals 80 to effect control of the solenoid actuated valves and the pump 60.

During normal braking the master cylinder 10 forces fluid through the source control valve 24 to wheel cylinders 40 and 44. Fluid flow is unrestricted and the pressure in the sump 58, accumulator 62, pump 60, and at the decay valves 54, 56 remains low. Pressure at the brake wheel cylinders 40, 44 is released through the build/hold valves 34, 36. Fluid flow is again unrestricted. Pressurized fluid may also pass from the brake wheel cylinders 40, 44 through the check valves 46, 48 to the master cylinder 10.

Upon sensing an incipient wheel skid condition, the electronic control unit 78 energizes the build/hold valves 34, 36, operation of the valves in response to a control signal being as indicated by adjacent arrows. This stops fluid flow from the master cylinder 10 to the wheel cylinders 40, 44. A small amount of fluid may pass from the brake wheel cylinders 40, 44 to the closed decay valves 54, 56 resulting in an initial slight brake pressure drop. This may delay or reduce the need for additional pressure decay in some braking situations. Pressure can be gradually increased by pulsing the build/hold valve. To effect pressure decay, energization of the build/hold valves 34, 36 is maintained. The decay valves 54 and 56 are energized allowing fluid from the brake wheel cylinders 40, 44 to pass through the build/hold valves 34, 36 and through the decay valves 54, 56 to the sump 58. The sump, which includes a lightly loaded piston, is displaced allowing quick release of brake pressure. The decay valves 54, 56 may be pulse modulated to control the rate of pressure reduction. The individual decay valve 54, 56 enable independent control of decay.

It should be noted that the pump 60 is turned on upon the occurrence of a first decay cycle. Fluid is pumped from the sump 58 to the accumulator 62. If the source control valve 24 is energized, fluid will be pumped into the accumulator 62 and/or to the other brake wheel cylinder (associated with a non-energized decay valve 54, 56) when the latter is in a build state (described below).

Normally the source control valve 24 will be energized upon the occurrence of a first decay cycle. This prevents the pump 60 from refilling the master cylinder and causing the pedal rise. In some cases it may be preferable not to isolate the master cylinder 10, such as, for example, when the rear wheel brakes are cycled (pressure hold, decay and build) and the fronts are not. In this case, fluid will be pumped through the source control valve 24 and back to the master cylinder 10. This can cause some pedal rise in the master cylinder 10 but master cylinder flow rate to the front brake wheel cylinders 40, 70 will not be restricted allowing normal pressure rise to continue.

To effect pressure build, it is preferred that decay valves 54, 56 be de-energized and necessary that the build/hold valve 34 or 36 be de-energized. The source control valve 24 remains energized, and fluid from the accumulator and pump 60, 62 passes to the brake. The flow rate, and, accordingly the rate of pressure build, is controlled by the orifice 64. Additional modulation of the build rate may be effected by duty cycle pulsing of the build/hold valves 34, 36.

If the vehicle brake hydraulic system is arranged in a diagonal split configuration, and if both the front and rear brake circuits are requesting a pressure build, the rear channel remains in a pressure hold condition until the associated front brake operates to a hold or decay condition. This prevents any pressure transfer between the front and rear brakes. If the source control valve 24 is not energized, the master cylinder 10 pressure is used to rebuild the brake pressure at the wheel cylinders resulting in a pedal drop. This drop is acceptable since de-energization of source control valve 24 is indicative of a non-anti-lock operating mode. Further, the rate of drop can be controlled by pulsing the source control valve 24 and/or the build/hold valves 34, 36.

The sump and accumulator 58, 62 may be provided with piston position switches 59, 63 which provide an indication to the electronic control unit 78 that the sump 58 and/or accumulator 62 are empty. When this condition exists for a specified period of time, fluid from the master cylinder is used to continue building brake pressure. Under these conditions, it is necessary to avoid an abrupt pedal drop and rapid brake pressure rise. To effect this, the source control valve and the build/hold valves 34, 36 are alternately energized under control of the electronic control unit 78 so that the neither are open at the same time. This mode of operation may be adjusted via electronic control to provide some overlap to effect increased pressure build rates.

In the event that the master cylinder is released such that its pressure output is less than the brake pressure at the same time that the source control valve 24 or the build/hold valves 34, 36 are energized, pressurized brake fluid in the wheel cylinders 40, 44, 70, and 72 will pass to the master cylinder 10 through the release check valves 46, 48.

If the sump 58 should momentarily fill during a long pressure decay, the pressure in the sump will become equal to the pressure in the wheel cylinders. The decay rate under these conditions is limited by the pump 60 flow capacity. Similarly, if the accumulator should momentarily fill during a long decay or hold while fluid remains in the sump 58, the pump 60 output will exceed normal operating pressure. This excess pressure will be relieved by "blowing" through the energized build/hold valves 34, 36 and back to the brake circuit. If the sump 58 is also saturated at this time, the ability to decay pressure is ended. However, by maintaining sump 58 plus accumulator 62 displacement equal to the master cylinder chamber displacement, the likelihood of this condition is minimal.

Alternatively, pump output relief valves 67 could be included in the pressure modulator configuration. Valves 67 would relieve excess pump 62 output at saturation back to the master cylinder 10. This arrangement will result in a pedal rise under these conditions. This option would permit a reduction in accumulator size but would also compromise pedal feel proportionately.

At the end of the anti-lock cycling, cycling of the pump 60 will continue until the sump 58 is empty, or alternatively, for a predetermined period of time sufficient to ensure that the sump is emptied. During this time period, and the period that the source control valve 24 remains energized, accumulator 62 fluid will discharge to the build/hold valves 34, 36 and through the release check valves 46, 48 back to the master cylinder. If the isolation valve 24 is de-energized, accumulator pressure will blow by the source control valve 24 back to the master cylinder. Residual pressure may be trapped in the accumulator circuit.

From the above description it will be seen that the system provides individual wheel control with pressure decay, hold and build capabilities. Original equipment manufacture hydraulic splits are fully maintained, the system being applicable to existing braking systems as an "add on" feature. The brake pressure is decayed to limited displacement sumps, and is pumped to high pressure accumulators for storage prior to rebuilding of brake pressures. The accumulators allow for minimal pedal pumping during cycling. Limited displacement sumps limit pressure loss with failed pump conditions. The build/hold and decay valves provide redundant leak protection. The system may function in any diagonal or vertically split brake system and can be configured for individual channel control or with combined channels such as one front plus one rear with a diagonal split. The use of electronically controlled valves permits full versatility and modification of system parameters to trim effects such as pedal rise, pedal drop, and the harshness of transitions between decay, hold, and build operating states.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. An anti-lock braking system comprising: a master cylinder means for generating a first source of pressurized braking fluid in response to manual manipulation of a pedal and first and second wheel cylinders arranged in a braking circuit, sensor means operatively coupled to a vehicle wheel for generating speed signals proportional to the speed of said wheel, pump means for intermittently generating a second source of pressurized braking fluid, computing circuit means connected to receive said speed signals for generating a plurality of control signals in response thereto, electrically operable modulating means arranged to define a pressure control circuit for each said wheel cylinder connected to said computing circuit means and responsive to said control signals for controlling the application of pressurized braking fluid to said wheel cylinder in response to predetermined ones of said control signals, said modulating means including:

a first three-way solenoid valve means having a first inlet port connected to a normally opened hydraulic circuit to said master cylinder, a second inlet port connected to a normally closed circuit hydraulically connected to said pump means and an outlet port connected to the first and second wheel cylinders;

first and second two-way solenoid valve means, each of said two-way solenoid valve means having a first port and a second port said first port being connected to a brake circuit for said first and second wheel cylinders and said second port being connected to said pump means; and second and third three-way solenoid valve means, each of said second and third three-way solenoid valves having a third inlet port connected to said outlet port of said first three-way solenoid valve means, a fourth inlet port connected to one of said first outlet ports of said two-way solenoid valve means and a second outlet port connected to one of said first and second wheel cylinders, said second and third three-way solenoid valves being responsive to a first control signal for selectively releasing pressurized braking fluid to said first and second two-way solenoid valves to initially reduce the pressurized fluid supplied to said first and second wheel cylinders and said first and second two-way valve means being responsive to a second control signal for selectively releasing further pressurized braking fluid from said first and second wheel cylinders, said first three-way solenoid valve means being responsive to a third control signal for selectively presenting pressurized fluid from said pump means through said second inlet port to said outlet port for communication to said second and third three-way solenoid valve means, and second and third three way solenoid valve means, responding to said third control signal to selectively allow braking fluid pressure to the first and second wheel cylinders to increase.

2. The system of claim 1 wherein said pump means includes an accumulator and a sump, the displacements volumes of said accumulator and said sump being less than the displacement of master cylinder.

3. The system of claim 2 wherein said source valve means further includes means for relieving pressure in said accumulator, said accumulator including means for sensing the piston position thereof, said computing circuit including means responsive to said piston position sensing means for detecting a failure of said accumulator.

4. The system of claim 1 wherein there is a said wheel cylinders in each said braking circuit associated with a front and a rear wheel of said vehicle arranged in a diagonal split configuration, there being a said build valve means and a said decay valve means associated with each said wheel cylinder.

5. The system of claim 1 wherein said system includes two braking circuits arranged in a diagonal split configuration, there being a said source selection valve for each said circuit of said braking system, and a said build valve means and decay valve means for each control channel of said system.

* * * * *